Patented Sept. 1, 1925.

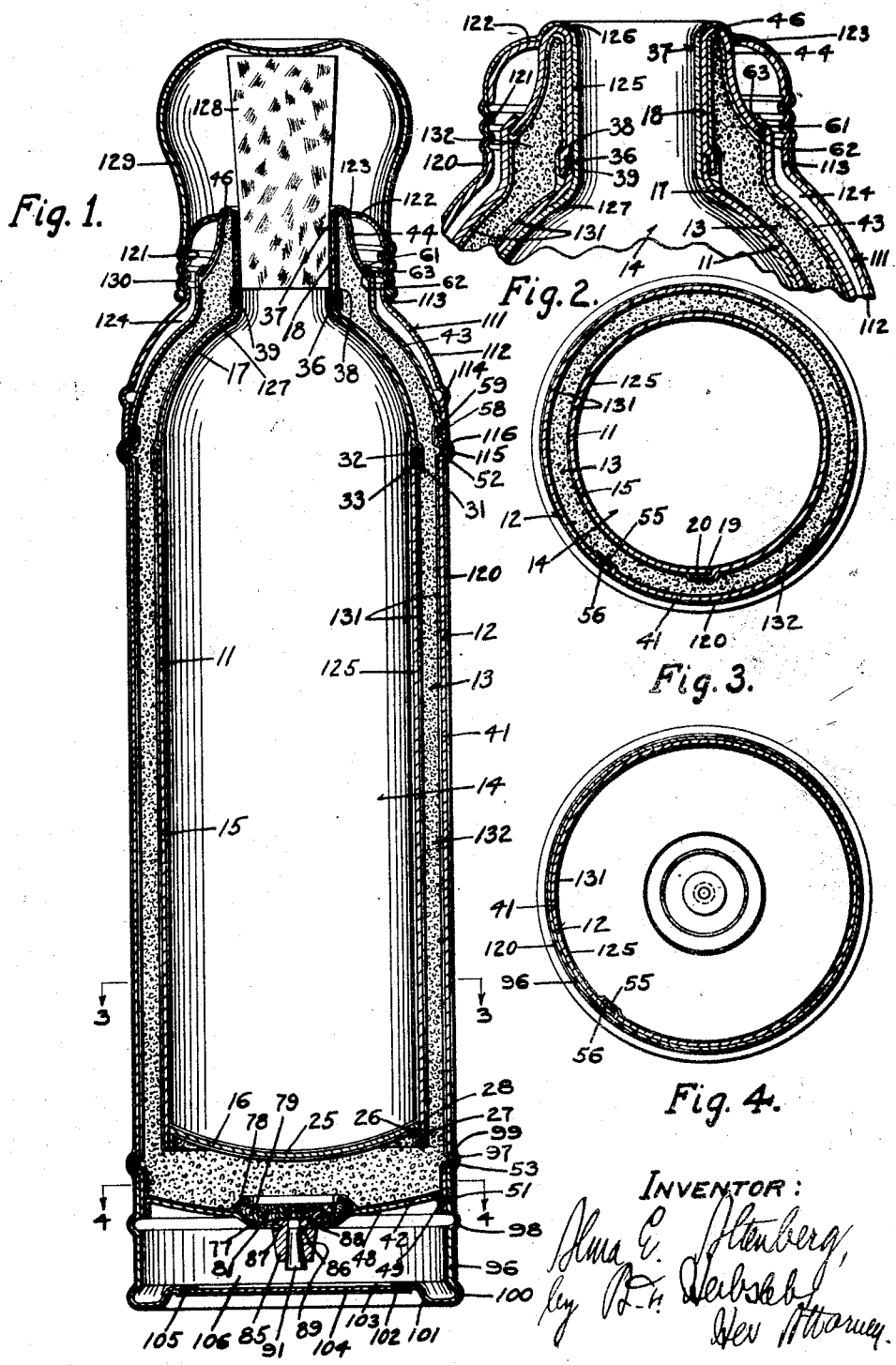

1,551,778

UNITED STATES PATENT OFFICE.

ALMA E. ALTENBERG, OF CINCINNATI, OHIO, ASSIGNOR, BY MESNE ASSIGNMENTS, TO THE ICY-HOT BOTTLE COMPANY, A CORPORATION OF OHIO (1923).

DOUBLE-WALLED VESSEL.

Application filed December 31, 1921. Serial No. 526,269.

*To all whom it may concern:*

Be it known that I, ALMA E. ALTENBERG, a citizen of the United States, residing at Cincinnati, in the county of Hamilton and State of Ohio, have invented certain new and useful Improvements in Double-Walled Vessels, of which the following is a specification.

It is the object of my invention to provide a novel heat-insulated vessel comprising metallic walls surrounding a heat-insulating space which is located about the containing portion of the vessel.

It is the object of my invention further to supply the heat-insulating space in a double walled heat-insulated vessel, with a purified insulating material of cellular structure, containing a preponderance of minute cells or recesses to form a filling material which is light in weight in comparison with its bulk and having minute cells or recesses which intercommunicate, and the air in which has been rarefied to increase the heat-insulating properties of the vessel; and, further, to provide a double metal walled heat-insulating space and to provide the metal walls with radiant opaque surfaces for reflecting actinic rays or the rays of radiant heat, in order to arrest the transmission of heat to and from the contents of the vessel.

It is the object of my invention, further, to provide a heat-insulating metal-walled bottle so constructed that a short neck containing heat-insulating material is provided, the opening in the neck being sufficiently short and wide so that ready access may be had through it to the interior of the vessel, especially to the upper inner wall of the breast thereof, by means of a cleaning cloth held about the finger of the person cleaning the bottle, the neck being of such brevity and width that the person cleaning the same may insert the finger with the cleaning cloth thereover and thereby with it reach the upper inner wall of the breast of the bottle; further, to provide a bottle of the character mentioned with a reinforcing breast and neck portion received about the outer wall of the double-walled metal bottle to enclose a dead air space about said neck and breast; further, to provide the insulating space between the main walls of the vessel with novel closing means; and, further, to provide novel means whereby the vessel may have a vacuum in its insulating space readily recreated.

The invention will be further readily understood from the following description and claims, and from the drawing, in which latter:

Fig. 1 represents a longitudinal axial section of a metal bottle embodying my invention.

Fig. 2 is a similar but enlarged view of the neck portion of the same.

Fig. 3 is a horizontal cross-section taken in the plane of the line 3—3 of Fig. 1. Fig. 4 is a horizontal cross-section taken in the plane of the line 4—4 of Fig. 1.

The vessel to which my present invention is adapted is exemplified as a bottle. It comprises an inner wall 11, and an outer wall 12, between which there is a heat-insulating space 13 about the containing portion 14 of the vessel. Its walls are exemplified as of metal, for instance, sheet steel, the joints in which are hermetically sealed, throughout their lengths, as by welding or brazing.

The inner wall is exemplified as comprising a body 15, a bottom 16, a breast 17 and a neck 18. The body of the inner vessel may be formed up of a flat blank, which is curled into cylindrical form so that its longitudinal edges lap outwardly to form a joint 19 which is hermetically sealed as by electrical welding, as indicated at 20. This joint forms an even surface with the inner surface of the inner vessel.

The bottom is shown downwardly dished at its middle as shown at 25, and is provided with an annular edge flange 26 extending downwardly from the outer edge of the bottom, and substantially concentric with the body, to form a joint 27 between the flange and the lower edge of the body, which is hermetically sealed, as by means of electric welding, as indicated at 28.

The lower edge of the breast is provided with an inner annular rabbet 31, in which the upper edge of the body is received for forming a joint 32 between the outer annular wall of said rabbet and said upper edge of the body, this joint being hermetically sealed, as by means of electrically welding said wall and said upper edge together, as indicated at 33, throughout the length of the joint. The rabbet forms a space for receiving said upper edge, so that the inner face of said inner member is continuous and smooth at said joint.

The upper end of the breast is provided with an annular flange 36, extending substantially parallel with the axis of the bottle. The lower end of the inner portion of a neck member 37 is provided with an annular rabbet 38, in which said annular flange is received for forming a joint therebetween, hermetically sealed as by electrically welding the same together, as indicated at 39, throughout the joint.

The outer wall of said heat-insulating space comprises a body 41, a bottom 42, a breast 43, and a neck 44. The inner neck 18 and the outer neck 44 are at their upper margins provided with an annular bead 46 which forms the pouring lip of the bottle, the inner heat insulating space extending preferably upwardly to the inner face of said pouring lip. A neck-member is thus formed which comprises the neck portions of the inner and outer walls and the mouth and pouring lip of the bottle.

The bottom is preferably outwardly dished towards its middle, as shown at 48, and is provided with a peripheral flange 49 extending outwardly and substantially parallel with the lower end of the outer body. This lower end of the outer body and the annular peripheral flange form a joint which is hermetically sealed, as by being electrically welded, as indicated at 51, throughout the length of the joint. The body is preferably provided with reinforcing annular beads 52, 53.

The outer body may be formed up of a flat blank rolled in the form of a cylinder with its longitudinal edges lapping inwardly to form a joint 55, hermetically sealed, as by electric welding, as indicated at 56, throughout its length. This joint forms an even surface with the outer surface of the bottle.

The lower edge of the outer breast is provided with a cylindrical flange 58 received over the upper edge of the outer body, with the lower edge of the cylindrical flange proximate to the upper bead 52, for forming a joint which is hermetically sealed, as by electric welding, as indicated at 59, throughout the length of the joint.

The upper edge of the outer breast is provided with an annular flange 61, which tapers upwardly toward the axis of the breast. The outer neck flares outwardly towards its lower end. The lower end of the outer neck is provided with a flange 62 complemental to the flange 61. The flanges 61 and 62 form a joint which is hermetically sealed, throughout its length, as by electric welding, as indicated at 63.

The bottom of the outer member is at its middle axial portion provided with an outwardly bulged depression 77, at the inner face of the rim of which a ring 78 is secured, this ring forming a flange or lip, extending toward the axis of the bottle to form an annular recess 79 surrounding the depression 77 to form a recess provided with an overhanging wall. A body 81 of arresting material, for instance, asbestos fiber, is placed in said recess and held in said depression by means of said overhanging lip.

A nipple 85 projects from the wall of said depression, preferably at the axis of the bottle. It has a reduced end 86 for forming a shoulder 87. The bottom of the depression is provided with a hole, the wall of which is received over said reduced end on said shoulder, said reduced end being upset or flanged over the upper or inner face of said wall, as shown at 88, for rigidly securing said nipple to said bottom and forming a joint therebetween which is hermetically sealed, as by electrically welding the two parts together.

The nipple 85 is formed with a bore 89, which preferably contracts taperingly inward.

A plug 91, shown as a tapering plug, is received in said bore and is forced into the same for compressing the plug within the wall of the bore. The taper of the plug is complemental to the taper of the bore. The wall of the socket is preferably of hard metal, for instance, steel, while the plug is preferably of soft metal, for instance, lead, which may be compressed into the bore and thereby form an hermetic seal. This is preferably accomplished by forceful insertion of said plug by outer axial pressure, as by the blow of a plunger. The coacting tapered portions of the plug and bore are comparatively long, being of substantially greater lengths than diameters, for forming a contact surface between the plug and the wall of the bore, throughout which the plug is compressed by lateral pressure against said wall by axial movement of the plug to form a hermetically sealed joint. I further prefer to seal the joint between the plug and the wall of the socket by means of a binder, such as shellac. The outer end of the plug preferably projects outwardly beyond said bore, so as to be gripped by means of a suitable tool, as a pair of pliers, for pulling out the plug if this should be desired for the purpose of recreating a vacuum or rarefied air in the insulating space between the walls of the vessel.

A base 96 is received about the bottom of the outer member. It is shown provided with reinforcing beads 97, 98. The wall of the base is received about the lower end of the wall of the outer member, the bead 97 being received about the bead 53, the upper edge of the bead 97 being turned or spun about the bead 53 for forming a joint 99 between them, which is preferably an air-tight joint, which may be soldered, brazed or welded throughout its length, to form the space between the bottom of the outer wall of the double walled vessel and the base a dead air space.

The base is at its bottom provided with an enlarged bead 100 on which the bottle rests. The bead is continued as an inner flange 101, at the upper end of which there is an inwardly extending annular flange 102, to form an opening 103 at the bottom of the base. A closing plate 104 is received against this flange to close said opening, and is fixed to said flange to form a joint 105, as by soldering, brazing or welding throughout the joint, to close the lower space between the bottom of the outer wall of the double-walled bottle and the base, whereby a dead air space 106 is formed between the base and the bottom of the outer wall of the bottle.

I prefer to provide the breast and neck portions of the outer wall with a surrounding and protective auxiliary breast and neck portion 111, comprising a breast 112 and a neck 113. The breast is provided with an annular bead 114 and an annular bead 115, the latter received over the annular bead 52 of the outer body, and is crimped thereover, and preferably soldered, brazed or welded thereto, to form an air-tight joint 116 therebetween.

The neck portion is provided with outwardly extending threads 121, formed into the metal of the auxiliary neck, as by pressing the same thereinto. The upper end of the neck has an inwardly projecting annular flange 122, the inner edge of which contacts the neck of the outer wall adjacent to the pouring lip 46, and forms a joint 123 therewith, as by soldering, brazing or welding, to form an air-tight joint. A dead air space 124 is located between the breast and neck portion of the outer wall of the double-walled bottle and said auxiliary breast and neck member, which extends close to the pouring lip of the vessel, and encompasses the upper portion of the insulating space between the double walls for aiding in resisting heat transference between the inside and outside of the bottle.

The inner surface of the inner vessel is provided with a suitable coating 125, preferably a vitreous coating, for instance, of vitreous enamel, this inner coating covering the entire inner surface of the inner vessel, and preferably extending outwardly to an annular line, exemplified at 126, adjacent to but within the outer edge of the mouth, to prevent danger of contact of the enamel with objects into which the contents of the bottle may be poured, by which loosening, cracking or breaking of the enamel might be caused. The enamel employed preferably has a coefficient of expansion similar to the coefficient of expansion of the metal.

A suitable stopper 128, as of cork, is received through the mouth into the neck. A cap 129, shown as a cup, provided with threads 130, complemental to the threads 121, is screwed about the threads 121, for closing the bottle and holding the stopper in place. The threads may assume the form of other desirable connecting means between the cap and the body.

The inner neck 18 of the bottle is short and wide, and the inner upper surface 127 of the inner breast 17 is substantially close to the pouring lip of the bottle, whereby a person may, with a cloth about the finger, readily insert the cloth covered finger through the mouth of the bottle and cleanly wipe the breast of the bottle, enhancing the sanitary properties of the bottle.

The outer surface of the bottle including preferably the upper edge of the pouring lip to the line 126, is suitably finished, preferably by polishing the same to produce a bright reflecting opaque finish, and nickel-plating the same, to form a coating 120, whereby to arrest the passage of actinic rays or radiant heat rays, although the outside of the bottle may also be provided with other kinds or character of finish.

The space 13 between the inner member and the outer member forms a heat-insulating space. The inner surface of this space is preferably provided with a coating 131 to form opaque outwardly reflecting surfaces to arrest actinic rays or radiant heat rays and to prevent their passage from the inside to the outside and from the outside to the inside of the bottle. I prefer to provide such coating of a material which will close any pores there might be in the metal forming the walls of this space, and to occlude any gases there may be on the inner surface of this space to prevent such occluded gases passing through said coating into the heat-insulating space.

I prefer that this coating shall be a coating of silver solution received over the inner surface of said walls for depositing a coating of silver or mercury upon the same. The coating solution may be introduced through the bore 89, and the residue thereof removed from said space through said bore. The rinsing of said surface after coating may also be accomplished by the introduction of water through said bore, agitating same, and discharging said water through said bore.

The structural parts of the vessel are preferably made out of sheet metal, for instance, sheet steel, the inner surface of the heat-insulating space being suitably cleaned and treated prior to application of the inner coating.

I desirably insert in the heat-insulating space 13 between the inner wall and the outer wall, a light cellular substance which has been previously heat treated to consume the deleterious substances therein as well as extract the moisture therefrom, in order to purify the same, and thereby to aid in the creation of a vacuum in the heat-insulating space. I prefer that the substance shall of itself be an insulating material, that it contain large quantities of minute cells or minute spaces or recesses which communicate with each other, and that after heat treatment it shall be substantially non-absorbent of gases. The further characteristics of the material which I prefer to employ are that it is buoyant, that it is light in weight in comparison with its bulk, that it shall not become packed or dense by its own weight or mass, and that it shall continuously substantially present and maintain its original cellular structure during use of the vessel so that the same may continue to fill the heat-insulating space in the vessel throughout use thereof over a long period of time.

I have found such desirable material to be what is known as diatomaceous earth, which is a species of algæ and is found in deposits in this country and in various parts of other countries. The filling body of this material is shown at 132. This earth is ground into a fine powder and forms extremely small grains which are cellular structures, or substantially so, to form recesses and spaces between the structures which communicate with each other. After said finely ground powdered diatomaceous earth has been air-dried as to be apparently dry, I place the same in a furnace or retort and subject the same to heat for imparting heat thereto of from four hundred degrees to six hundred degrees Fahrenheit, throughout a period of about one hour, and at the same time withdraw the air and gases of evaporation in the retort by means of a pump, burning the vegetable matter and foreign substances as well as moisture in the diatomaceous earth and removing the same by exhausting.

I preferably fill the heat-insulating space with such heat-treated diatomaceous earth by passing the same through the bore 89 prior to the insertion of the filtering material 81 and the closing plug 91, but the diatomaceous earth may be filled into said space prior to the closing of said space by the insertion of the outer bottom 42.

I prefer to exhaust the air from said space. The exhausting of the air from the heat-insulating space is accomplished by suitable means, for instance, by usual vacuum pumps for rarefying the air or creating a vacuum in said heat-insulating space in the presence of heat. The air in said space is drawn through said taper bore 89, and the arresting material 81, to retain the finely divided insulating material in said space when employed. The plug is inserted when a sufficient degree of vacuum has been obtained in said space for sealing said space and maintaining a vacuum therein.

It may, as hereinbefore stated, be desirable to insert the insulating material in the heat-insulating space prior to attachment of the outer bottom 42. In such case the connected inner and outer walls, omitting the outer bottom are placed upside down, and the insulating space filled with the insulating material, the outside bottom, with the arresting material 81 in place, being then applied and hermetically sealed. If the inner surface of the insulating space is to be provided with a coating to arrest actinic rays, such coating is applied separately to the inner face of the bottom and of the balance of the double walled vessel prior to the joining and hermetical sealing of the same.

The base 96 may be secured to the outer member before or after said space is exhausted. After exhaustion of said space, the outer plate 104 is secured in place, as by means of soldering, so that, if desirable, said plate may be again readily removed by heating the solder and releasing the plate.

It may, for instance, be desirable in the course of time to re-exhaust said space, which can be readily done by removal of said plate, the removal of said slug, the re-exhaustion or recreation of a vacuum in the heat-insulating space, and inserting a new plug. When said exhaustion has been completed, the plate 104 is then again soldered in place for again closing the dead air space in said base. This replenishing of the vacuum in the bottle may take place repeatedly.

Having thus fully described my invention, what I claim as new, and desire to secure by Letters Patent, is:

1. In a double-walled bottle, the combination of an inner metal wall having a bottom and an outer metal wall having a bottom and having a heat-insulating space therebetween, said bottom of said outer wall provided with a central depression, an inner flange surrounding said depression for forming a recess, a fibrous arresting material in said recess, the wall of said depression provided with an aperture, means for closing said aperture, and a finely divided insulating material substantially filling said heat-insulating space.

2. In a double-walled bottle, the combination of an inner metal wall having a bottom and an outer metal wall having a bottom and having a heat-insulating space therebetween, said bottom of said outer wall provided with a central depression, an inner flange surrounding said depression for forming a recess, a fibrous arresting material in said recess, the wall of said depression provided with an aperture, means for closing said aperture, a finely divided insulating material substantially filling said heat-insulating space, a socket-piece secured in said aperture, said socket-piece provided with an outwardly tapering socket, and a taper plug forced into said socket for closing said space.

3. In a double-walled bottle, the combination of an inner metal wall and an outer metal wall having a heat-insulating space therebetween, said walls comprising bottoms, said outer bottom provided with an aperture, an auxiliary bottom received about said outer bottom comprising a removable plate, a joint between said auxiliary bottom and said outer body, a dead air space between said outer bottom and said auxiliary bottom, and closing means for said aperture in said dead air space, said closing means being accessible from the outside of said auxiliary bottom by removal of said removable plate from said auxiliary bottom.

4. In a double-walled bottle, the combination of an inner metal wall and an outer metal wall having a heat-insulating space therebetween, said walls comprising bottoms, said outer bottom provided with an aperture, an auxiliary bottom received about said outer bottom comprising a removable plate, a joint between said auxiliary bottom and said outer body, a dead air space between said outer bottom and said auxiliary bottom, closing means for said aperture in said dead air space, said closing means being accessible from the outside of said auxiliary bottom by removal of said removable plate from said auxiliary bottom, said closing means comprising a socket-piece provided with a taper socket, and a removable plug of softer material than said socket-piece forced into said socket to form a seal between said socket and said socket-piece.

In testimony whereof, I have hereunto signed my name.

ALMA E. ALTENBERG.